3,210,659
METHOD OF SEPARATING AN ELECTRIC ARC LENGTH OF A COATED WELDING ELECTRODE UNDER WELDING CONDITIONS INTO TWO COMPONENT ARC LENGTHS
Fumio Oshiba, 2587 Honcho 3-chome, Koganei-shi, Tokyo, Japan
Filed Dec. 6, 1960, Ser. No. 74,168
Claims priority, application Japan, Mar. 9, 1960, 35/7,275, 35/7,276
1 Claim. (Cl. 324—71)

The present invention relates to a method of separating an electric arc length of coated welding electrode under welding conditions into two component arc lengths.

Generally, an electric arc in arc welding of metals with coated welding rods or electrodes consists of two component arc lengths the one length being produced by metallic vapors generated from core metal of the rod and the metal to be welded and the other length being produced by vapors and gases generated from the coating material of the electrode. Accordingly, the stability and melting power of the electric arc when it melts a steel plate are principally dependent upon the composition of core metal of the rod as well as the rod coating ingredients, their mixing ratio, and quantities of the coating material. According to hitherto established theories, the role of coating for coated electrodes is simply considered to merely protect an electric arc by surrounding it with high temperature gases generated by the coating material as it is consumed. On the other hand, we have had no critical standard for judging the stability of an electric arc and the so-called "try and judge" method has been resorted to exclusively.

Therefore, it has been extremely difficult to find suitable coated electrodes for a particular application, even after detailed comparative investigations on each specific welding capacity or behavior of all the available coated electrodes. It is far more difficult to promote the manufacture of novel types of coated electrodes suitable for particular welding purposes. Accordingly, there has been an urgent need and demand in the industry for the production of an excellent testing method capable of investigating the construction of electric welding arcs for the purpose of clarifying characteristics of coated electrodes.

In reflection of those circumstances, the testing method according to the present invention has been completed after exhaustive investigations to fulfill the above-mentioned need. The object of the testing method is to provide a simple and clear analysis of the separate effect of rod coating material and core metal of coated welding electrodes. Another object of the testing is to furnish assistance to the method of manufacturing coated welding electrodes of novel types by controlling compositions of coating materials and also of core metals.

A further object of the testing method according to the present invention is to contribute to the manufacturing of special welding fluxes such as "Union melt" flux.

In the following, the testing method of the present invention, i.e. the method of separating an electric arc length of coated electrode under welding conditions into two component arc lengths, will be described by way of example with reference to the accompanying drawings, wherein.

Presently a method of comparing the stabilities of electric welding arcs is practiced wherein a steel plate to be welded is first placed horizontally, then a coated electrode is positioned perpendicularly to said plate, its one end being held apart about 2 or 3 mm. from the steel plate surface and its other end being fixed. Then, an electric arc is caused to build up across the gap between the steel plate and the coated electrode. The electric arc thus formed increases gradually in its length as the coated electrode is consumed, and finally it will be extinguished as the coated electrode is consumed. The final length of the electric arc is the longest one attainable during such downward welding. Using the longest arc length, the stabilities of electric arcs of various kinds of coated electrodes are compared. This is a known method of testing for arc stabilities.

Since such a mere comparison of longest arc lengths is not sufficient to judge the true stability of an electric arc, it became necessary to develop another testing method which is more reasonable and effective.

The testing method according to the present invention serves very well for the purpose mentioned above. By means of the instant testing method the maximum length of electric arc may be separated into two component arc length portions, the one length being generated from the electrodes core metal and the other length resulting from the coating material of the electrode.

Figure 1:
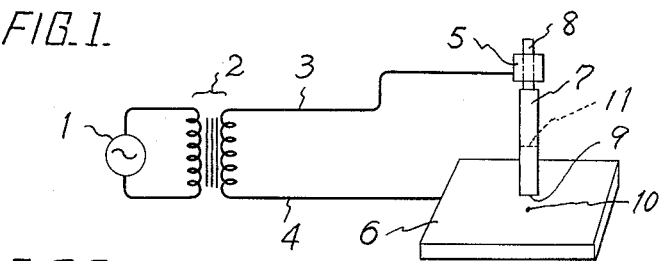
FIGURE 1 is a front view of an arrangement for downward bead welding being performed on a steel plate held horizontally with a coated electrode held in an vertical position to said steel plate, and an electric arc is generated between the fore-end of said electrode and the surface of said steel plate.

The actual process of testing will now be described in detail. For the test either an A.C. or a D.C. source may be utilizeed. In the A.C. downward welding as shown in FIGURE 1, the A.C. electric source 1 is connected to an A.C. welder 2 having lead cables 3 and 4. Cable 3 is connected to a metal fitting 5 to hold the electrode 7, and the electrical cable 4 is connected to a steel plate 6 which is held horizontally. The coated electrode 7 has an uncoated upper bare end portion 8 that is inserted in the electrode holding metal fitting 5, while its lower end 9 is positioned perpendicularly opposite and spaced about 2 or 3 mm. from the plate 6, a distance to ensure arising when the welding circuit is energized. The electrode 7 is referred to as an A type coated electrode.

Thereupon, an electric arc is generated by the A.C. welder 2 between the lower end 9 of coated electrode 7 and the opposite point 10 on the steel plate 6. Thus the coated electrode 7 is gradually consumed, and in accordance therewith the arc length is gradually increased until the arc is extinguished. The length of the electric arc at the time it is extinguished is the maximum length of arc under the welding condition and its magnitude is equal to the distance between the center of the crater formed on the steel plate 6 and the fore-end 11 of the consumed electrode. The process referred to above is designated as the first process for the sake of convenience in the following descriptions.

Figure 2:
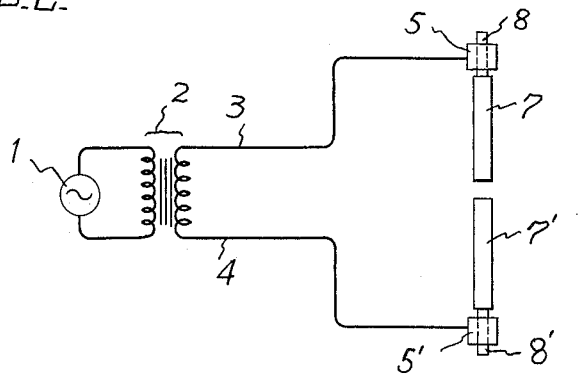
FIGURE 2 is a front view of another arrangement of electrodes, where two coated electrodes are held in axial alignment, and an electric arc is generated across both opposing fore-ends of said electrodes.

Referring now to FIGURE 2, it is seen that two electrodes 7, 7′ of A type coated electrodes having the same coating material as that of the electrode of the first process, are placed on a same vertical line; that is, in the same orientation as in FIGURE 1, the upper coated electrode 7 being inserted into the metal fitting 5 by its bare end portion 8 while the lower coated electrode 7' is inserted into the metal fitting 5' by its bare end portion 8'. The two electrodes 7 and 7' are fixed vertically with a distance of 2 or 3 mm. between their adjacent ends, a distance to ensure arising when the welding circuit is enjoyed.

Upon energization of the welding circuit an electric arc is caused to occur across the gap between both electrodes 7 and 7', with the same amperage and voltage from the same A.C. welder as in the first process illustrated in FIGURE 1. Then, with respective consumption of both welding electrodes, the arc length increases gradually until the arc is extinguished. The arc length attained finally, that is, at the time the arc is extinguished, is the maximum arc length, and it is equal to the distance between the opposing ends of the two coated electrodes consumed. This maximum arc length will be denoted as $L'$ and this process, hereinafter is designated as the second process.

Figure 3:
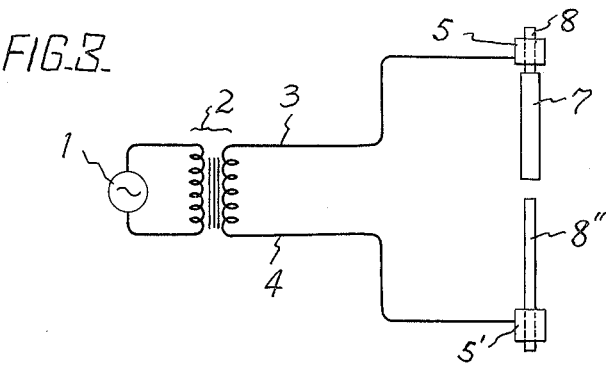
FIGURE 3 is a front view of another arrangement of electrodes, where an electric arc is generated between the fore-ends of the upper coated electrode and the lower bare electrode, both of which are held in axial alignment.

Furthermore, as illustrated in FIGURE 3, an electrode of the same type A coated electrodes having the same coating and core material as the electrode in the first and second processes, and a bare rod $8''$, which is the core of the coated electrode, are used to determine the maximum length of an electric arc. Coated electrode 7 is placed in alignment with the bare electrode $8''$ and secured vertically as in the second process. In this process, however, the coated electrode 7 is inserted into the metal fitting 5 in the upper position and the bare electrode $8''$ is inserted into the metal fitting 5' in the lower position in the same orientation as in the second process. Between the opposite fore-ends of coated electrode 7 and bare electrode $8''$ thus arranged, an electric arc is generated with the same amperage and voltage as used in the first and second processes and the maximum arc length is measured. This maximum arc length will be denoted as $L''$ and this process is designated as the third process in relation to the first and second processes.

Now, if the maximum arc length $L''$ obtained by the third process is substracted from the maximum arc length $L'$ obtained by the second process the value R is obtained as $R=L'-L''$ and it gives the maximum arc length solely due to the coating material of the coated electrode because the arc length due to the core metal of the coated electrode is eliminated.

Let the values mentioned above be $L_1'$, $L_1''$ and $R_1=L_1'-L_1''$ for the first type of coated welding electrode, say A, and $L_2'$, $L_2''$, and $R_2=L_2'-L_2''$ for the second type of coated welding electrode, say B. Then the difference $R_1-R_2$ is nothing but the difference between the maximum arc lengths of the coating materials of A and B electrodes, with the larger difference between $R_1$ and $R_2$ representing the larger difference in electric arc properties of the coating material of each type.

On the other hand, by means of the first process of the testing we measure the maximum arc length, say $L_1$, of the electrode of A type and also that arc length, say $L_2$, of the electrode of B type. $L_1$ is the maximum arc length which is the sum of the maximum arc length of the coating material of the A type electrode and the maximum arc length due to the core metal of the electrode. $L_2$ is the maximum arc length which is the sum of the maximum arc length of the coating material of the B type and the maximum arc length of the core metal of the electrode.

Denoting the maximum arc length due to the coating material of the A type electrode within the maximum arc length $L_1$ as $P_1$, and the maximum arc length due to as the core metal as W, $L_1$ is given as follows:

$$L_1 = P_1 + W$$

Similarly $L_2$ is given by $$L_2 = P_2 + W$$

where $P_2$ is the maximum arc length due to the coating material of B type electrode and W is the maximum arc length due to the core metal. W is the same in both types of electrodes because of the same chemical composition of their core metals. Hence, $$L_1 - L_2 = P_1 - P_2$$

Thus, $L_1-L_2$ gives the difference between the maximum arc length due to the coating material of A type electrode and that due to the coating material of B type electrode.

The individual values of $P_1$ and $P_2$ are unknown for the present, but the difference $P_1-P_2$ is known as shown just above. Hence the ratio of $P_1-P_2$ to $R_1-R_2$, the latter having been obtained as described hereinbefore, can be determined, i.e.

$$\frac{P_1-P_2}{R_1-R_2}=k \text{ (a constant)}$$

Now, if the coated electrodes, of both types A and B electrodes are such that the ability of ionization of the coating material and the electric arc length established therefrom are to be related to each other by the same rule in both types of electrodes, then both types of electrodes belong to the same system from the view point of the characteristic of electric arc building, in spite of different types of coating. In this case, the value of $P/R$ in each type is equal to each other. Taking this value as $k'$, we get the following formula:

$$\frac{P_1}{R_1}=\frac{P_2}{R_2}=k'$$

Similarly, and following the preceding example, it is determined also that the ratio $$\frac{P_1-P_2}{R_1-R_2}=k'$$

But, it is shown hereinbefore that also $$\frac{P_1-P_2}{R_1-R_2}=k$$

and it follows that:

$$k'=k$$

Therefore, $$P_1=kR_1$$

and $$P_1=kR_2$$

Thus, the respective maximum arc component length due to coating materials of types A and B electrodes may be determined.

Accordingly, the maximum arc length generated by the core metal, W, is given by the following formula:

$$W=L_1-P_1=L_2-P_2$$

Thus, an electric arc of a coated electrode under welding conditions may be separated into two component arc lengths, the one length being generated by the coating material of the electrode, and the other component length being generated by the core metal, using two different types of coating material, but of the same arc building characteristic.

The testing method of the present invention can also be carried out using electrodes with coating material of a particular type, having different coating thickness, in the same manner as described above.

Figure 4:
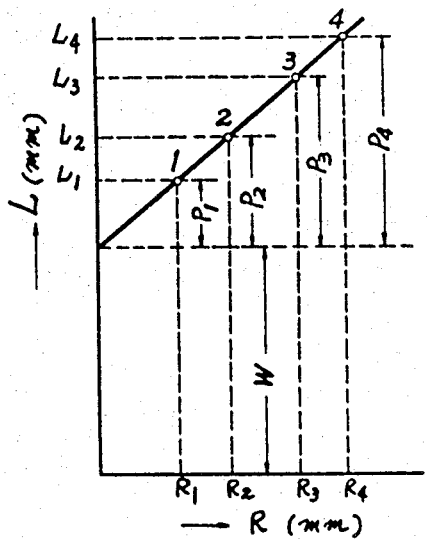
FIGURE 4 is a diagram showing measured values to prove the reasonability of the testitng method according to the present invention.

FIGURE 4 illustrates the results obtained using several electrodes with different kinds of coating materials, but of the same arc building characteristic, wherein $R_1$, $R_2$, $R_3$, $R_4$ are taken as abscissa and corresponding values $L_1$, $L_2$, $L_3$, $L_4$ as ordinate. As is shown in FIGURE 4, a straight line is obtained, which inclines toward the abscissa and intersects the ordinate axis at a certain altitude.

The straight line thus obtained shows a relation as follows:

$$P_1/R_1 = P_2/R_2 = P_3/R_3 = P_4/R_4 = \ldots = k$$

and the point of intersection on the ordinate axis gives the value of W.

Figure 5:
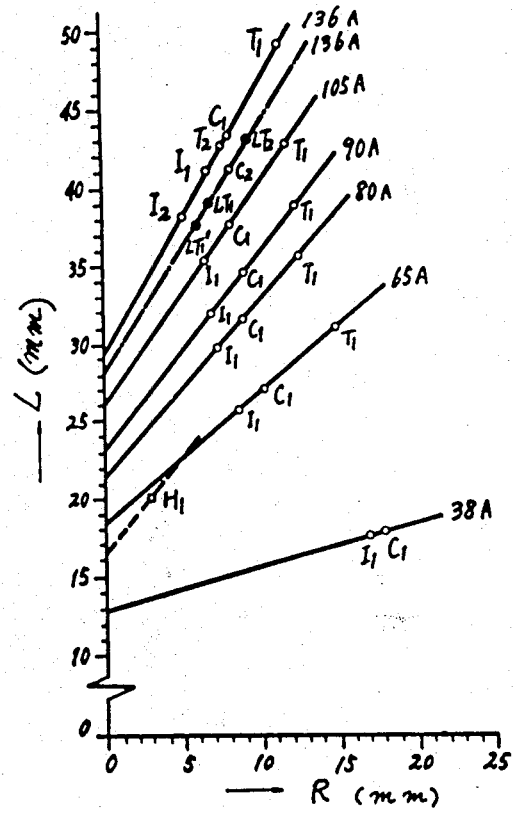
FIGURE 5 is a diagram summarizing the results of application of the testing method of this invention.

Actual examples are shown in FIGURE 5, wherein the curves of full line passing through single-lines circles with the welding current therein being changed within a range from 38 to 136 amperes by 6 stages, represent the $P/R$ relation, for different types of coated electrodes, i.e. of ilmenite, cellulose and titanium-oxide; all the results for the ilmenite type are shown by symbol I, those for the cellulose type by symbol C and those for the titanium oxide type by symbol T. Further, suffix 1 denotes the products of one electrode manufacturing company, and suffix 2 denotes the products of another electrode manufacturing company. According to the test results, it is seen that, for each welding current, proportionality relationship is established such as:

$$P_1/R_1 = P_2/R_2 = \ldots = k$$

Since the proportionality constant $k$ is a tangent of an angle of each straight line against the abscissa, it is apparently dependent upon the value of welding current, as seen in FIGURE 5.

Figure 6:
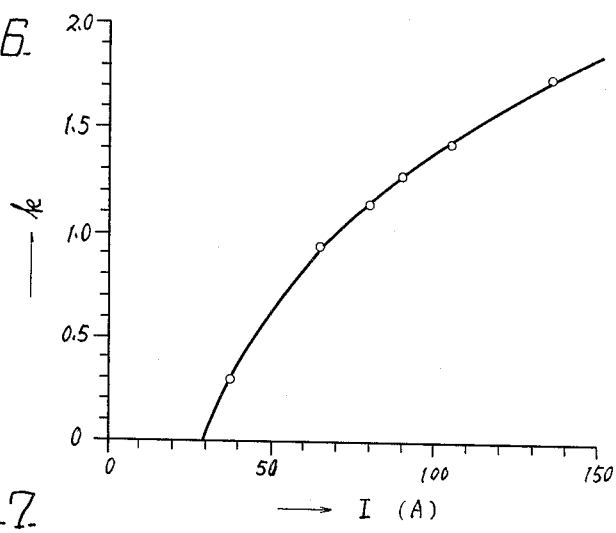
FIGURES 6 and 7 are diagrams showing respectively the results derived from FIGURE 5.

If the welding current is of I amperes, the relation between I and $k$, as illustrated in FIGURE 6, is given by a formula as follows:

$$28 \times 2.50^k = I$$

Figure 7:
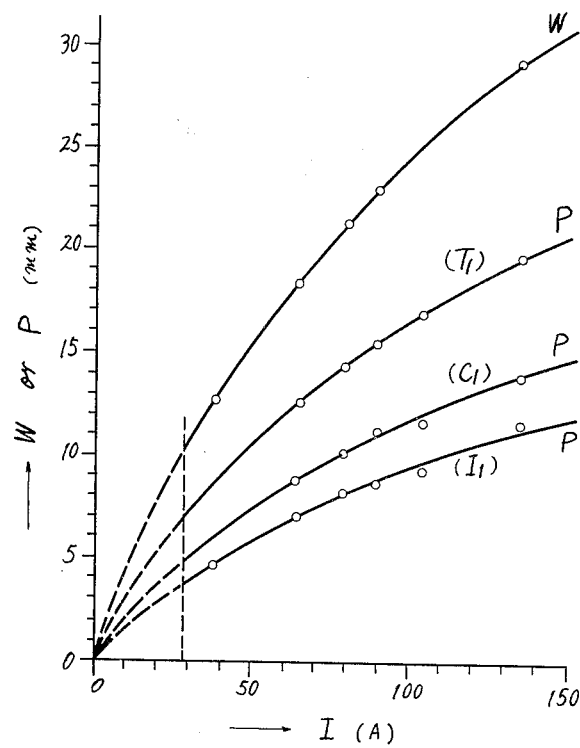

Next, W and P for each welding current are obtained from FIGURE 5, and the relations $W-I$ and $P-I$ are shown in FIGURE 7. Of course, while W makes a common curve for each type of the coated electrodes tested, P makes a different curve, which is shown with symbol $I_1$ (numeral 1 denotes the product of the first maker) for coated electrodes of ilmenite type, with symbol $C_1$ for those of cellulose type and with $T_1$ for those of titanium oxide type. The following formulas are obtained therefrom:

$$W = I^{0.69}, \quad P = \alpha I^{0.69}, \quad L = (1+\alpha)I^{0.69}$$

where $\alpha$ is a constant for a certain type of coating material, but varies according to different types of coating materials of electrodes; for instance, 0.383 for ilmenite type, 0.458 for cellulose type and 0.672 for titanium oxide type, W, P and L being all represented in mm.

Furthermore, two interesting facts were observed by the testing method of the present invention. The one is that the $P/R$ relations for coated electrodes of the lime-titania type and low hydrogen type are given by respective straight lines shown in FIGURE 5, by a dotted straight line with black circle marks ($LT_1$, $LT_1'$, $LT_2$—welding current of 136 amperes). On the other hand, square-mark point $H_1$ represents an actually measured value of $P/R$ for coated electrodes of the low hydrogen type coating and it might be possible to obtain a straight line as shown by the broken line, provided one more point were measured. Both straight lines, a dotted one and a broken one mentioned above, are evidently distinguished from those $P/R$ straight lines for the ilmenite, cellulose and titanium oxide type electrodes at the same electric current. Particularly, it is noticeable that the $P/R$ values for the low hydrogen type are remarkably lower as compared with $P/R$ straight lines for the coated electrodes of other type. Such as a fact may be the reason why blow holes are liable to occur in low hydrogen sort electrodes.

The second interesting fact is that measured values of $P/R$ for the cellulose type electrodes $C_2$ lies on the $P/R$ straight line for the lime-titania type electrodes. This fact may appear surprising, but in cellulose type electrodes, limestone is sometimes contained in the coating material which may cause the result just mentioned.

As proved in detail in the foregoing description from both theoretical and experimental points of view, the maximum arc length L for coated electrode of any type of coating material can be separated into two component arc lengths, a length P due to the coating material and another length W due to the core metal by means of the first to third processes of the present invention.

Instead of the testing method described as above, a simplified method can be applied to compare relative intensities of electric arcs generated from various kinds of welding fluxes. In this test, as illustrated in FIGURE 2 of the previous case, the second process, wherein two coated electrodes 7 and 7', both having a coating of the same type, are placed in alignment and opposite to each other, and the maximum length of electric arc generated across the two opposite tips of both electrodes is measured; then, as in the third process of FIGURE 3, a coated electrode 7 of the same type as mentioned just above, and a bare electrode 8'', prepared from the coated electrode 7 as by removing of its coating, are placed in the same spacial position as in the second process and the maximum length of electric arc generated across the two opposite tips of both electrodes is measured. The difference between these two maximum arc lengths is to be obtained. The arc length thus obtained is the maximum arc length which is generated solely by the coating material under a particular welding state. Hence, referring to such a value, the intensity of the electric arc of a given coating material of electrode or welding flux may be compared with that of any different coating material of electrode or welding flux.

In the two above-mentioned testing examples, explanations are directed to downward welding. However, the present invention is of course applicable to various welding positions other than downward welding.

It can be applied, for instance, to a vertical welding where a steel plate is held upright and a coated electrode is held horizontally and perpendicularly opposite the steel plate. It may be also applied to upward welding where a steel plate is placed above and a coated electrode is held vertically upward. The necessary operational condition in those applications is that the orientation of electrodes in the testing processes coincides with the welding position referred to, arranging the bare electrode in the testing processes in the corresponding place of the steel plate in the actual welding.

Applying the testing method of the present invention, characteristics of an electric arc under welding conditions are investigated and a number of useful facts are found as follows:

(1) A welding electrode with a certain type of coating material may be effectively utilized when the maximum arc component length due to the coating material and that arc component length due to the core metal are known.

(2) As the basis for estimating the stability of a welding arc component of a coated electrode, the maximum arc length generated by the coating material will serve better than the total maximum arc length of the coated electrode. For instance, the most stable type of welding electrodes under a certain welding current is the titanium oxide type, and the cellulose and ilmenite types follow it in turn.

(3) To judge the penetrating power of a coated electrode under welding conditions the maximum arc component length due to the core metal serves well.

(4) Also, an exact selection of coated electrodes most suitable for a particular welding purpose, or a strict control on properties of coated electrodes may be made.

(5) The method of separating the component electric arc length of coated electrodes according to this invention displays a remarkable effectiveness in the manufacture of coated electrodes of new kinds.

Inasmuch as the present invention is subject to many changes and various modifications, it is intended that all

What is claimed is:

In a method of separating the maximum arc length of a coated welding electrode under welding conditions into an arc component length generated by the electrode core metal and an arc component length generated by the electrode coating material, the steps comprising:

a first step of placing a consumable electrode of a first type of coated electrodes in an arc welding circuit including a steel plate, the electrode being spaced from the plate a distance to ensure arcing between such members when the circuit is energized, energizing the welding circuit and causing an arc to extend between the electrode and the plate and causing the electrode to be consumed so as to lengthen the distance between the electrode and the plate whereby the arc length is increased until the arc is extinguished, and measuring the distance between the steel plate and the unconsumed end of the coated electrode to obtain the maximum arc length therebetween;

a second step of placing two consumable electrodes of the first type of coated electrodes in an arc welding circuit with their consumable ends opposing each other a distance to ensure arcing therebetween upon energization of the circuit, energizing the welding circuit and causing an arc to extend between the consumable ends of the electrodes and consumption thereof such that the distance therebetween increases until the arc is extinguished, and measuring the distance between the unconsumed ends of said two electrodes to obtain the maximum arc length therebetween;

a third step of placing a consumable electrode of the first type coated electrodes and a consumable electrode of first type uncoated electrodes in an arc welding circuit with their consumable ends opposing each other a distance to ensure arcing therebetween upon energization of the circuit, energizing the welding circuit and causing an arc to extend between the consumable ends of the electrodes and consumption thereof such that the distance therebetween increases until the arc is extinguished, and measuring the distance between the unconsumed ends of said two electrodes to obtain the maximum arc length therebetween;

repeating the first, second and third steps with a second type of electrodes to obtain measurements of the first, second and third maximum arc lengths for the second type of electrodes;

the energization of the welding circuit applying the same voltage to the electrodes in each step whereby the maximum core arc component lengths of the first and second type electrodes having the same core metal may be computed from the following fomula:

$$W = L_1 - P_1 = L_2 - P_2$$

wherein $L_1$ and $L_2$ are the first measured maximum arc lengths for the first and second type electrodes, respectively, and $P_1$ and $P_2$ are the maximum coated arc component lengths for the first and second type electrodes, respectively, which may be computed from the following formula:

$$P_1 = kR_1 \text{ and } P_2 = kR_2$$

wherein $R_1$ is the difference, expressed as $L_1' - L_1''$, between the second and third measured maximum arc lengths of the first type electrode, $R_2$ is the difference, expressed as $L_2' - L_2''$, between the second and third measured maximum arc lengths of the second type electrode, and $k$ is a constant which may be computed from the following formula:

$$k = \frac{L_1 - L_2}{R_1 - R_2}$$

References Cited by the Examiner

UNITED STATES PATENTS

| | | | |
|---|---|---|---|
| 1,722,570 | 7/29 | Green | 219—135 X |
| 2,045,800 | 6/36 | Richter | 324—72 X |
| 2,752,690 | 7/56 | Heath et al. | 324—71 X |

WALTER L. CARLSON, *Primary Examiner.*

SAMUEL BERNSTEIN, JAMES LAWRENCE,
*Examiners.*